(12) United States Patent
Horio

(10) Patent No.: US 10,073,195 B2
(45) Date of Patent: Sep. 11, 2018

(54) OPTICAL LAYERED BODY, POLARIZER AND IMAGE DISPLAY DEVICE

(75) Inventor: Tomoyuki Horio, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1095 days.

(21) Appl. No.: 13/876,952

(22) PCT Filed: Sep. 21, 2011

(86) PCT No.: PCT/JP2011/071514
§ 371 (c)(1),
(2), (4) Date: Jun. 26, 2013

(87) PCT Pub. No.: WO2012/043341
PCT Pub. Date: Apr. 5, 2012

(65) Prior Publication Data
US 2013/0273354 A1    Oct. 17, 2013

(30) Foreign Application Priority Data
Sep. 30, 2010    (JP) .................................. 2010-221389

(51) Int. Cl.
| | | |
|---|---|---|
| G02B 1/14 | (2015.01) | |
| G02B 1/18 | (2015.01) | |
| G02B 1/10 | (2015.01) | |
| G02B 27/00 | (2006.01) | |

(52) U.S. Cl.
CPC .............. *G02B 1/14* (2015.01); *G02B 1/10* (2013.01); *G02B 1/105* (2013.01); *G02B 1/18* (2015.01); *G02B 27/0006* (2013.01); *G02B 2207/101* (2013.01); *Y10T 428/259* (2015.01)

(58) Field of Classification Search
None
See application file for complete search history.

(56) References Cited

U.S. PATENT DOCUMENTS

2010/0124656 A1* 5/2010 Horio .................. C08J 7/047
428/331
2010/0315715 A1   12/2010 Oki et al.

FOREIGN PATENT DOCUMENTS

| CN | 101722691 A | 6/2010 |
|---|---|---|
| CN | 101738650 A | 6/2010 |
| JP | 2009-042648 | 2/2009 |
| JP | 2010-085983 A | 4/2010 |

(Continued)

*Primary Examiner* — Elizabeth A Robinson
(74) *Attorney, Agent, or Firm* — Hamre, Schumann, Mueller & Larson, P.C.

(57) ABSTRACT

An optical layered body has a light-transmitting substrate and a hard coat layer formed on the light-transmitting substrate. The hard coat layer contains reactive irregularly shaped silica fine particles and a binder resin. The reactive irregularly shaped silica fine particles are unevenly distributed at the side of the light-transmitting substrate in the hard coat layer. The hard coat layer can be divided in its thickness direction into three equal regions (1)-(3), in an order from the interface on the side of the light-transmitting substrate. Ratios of reactive irregularly shaped silica fine particles in the regions (1)-(3) are 30 to 90% in area, 25 to 80% in area, and 10 to 35% in area, respectively. The ratios satisfy the following relationship: the ratio of the region (1)>the ratio of the region (2)>the ratio of the region (3).

21 Claims, 1 Drawing Sheet

(56) References Cited

FOREIGN PATENT DOCUMENTS

| JP | 2010-085985 A | 4/2010 |
|----|---------------|--------|
| JP | 2010-102123 A | 5/2010 |
| JP | 2010-120991 A | 6/2010 |
| JP | 2010-122325 A | 6/2010 |
| JP | 2010-131771 A | 6/2010 |
| KR | 10-2007-0063134 | 6/2007 |
| WO | WO-2009/104629 A1 | 8/2009 |

\* cited by examiner

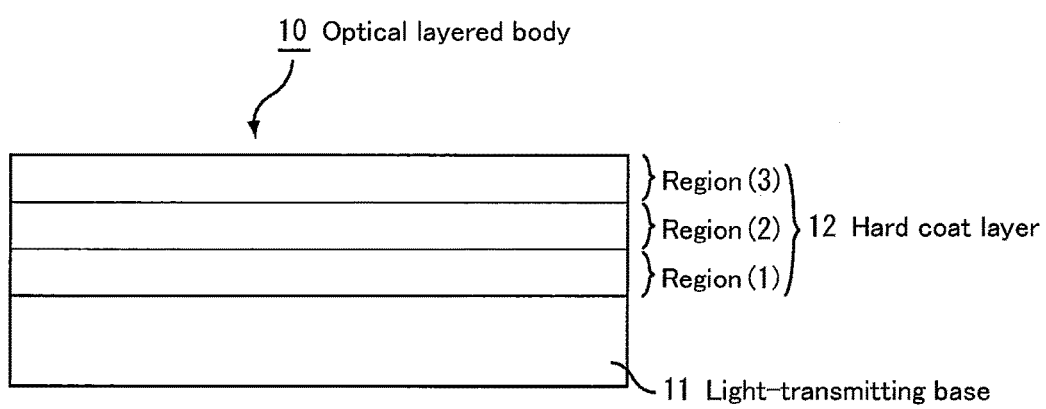

OPTICAL LAYERED BODY, POLARIZER AND IMAGE DISPLAY DEVICE

CROSS REFERENCE TO RELATED APPLICATIONS

This application is a National Phase filing under 35 U.S.C. § 371 of PCT/JP2011/071514filed on Sep. 21, 2011; and this application claims priority to Application No. 2010-221389 filed in Japan on Sep. 30, 2010, under 35 U.S.C. § 119; the entire contents of all are hereby incorporated by reference.

TECHNICAL FIELD

The present invention relates to an optical layered body, a polarizer, and an image display device.

BACKGROUND ART

Image display devices, such as cathode-ray tube (CRT) display devices, liquid crystal displays (LCDs), plasma display panels (PDPs), electroluminescence displays (ELDs), field emission displays (FEDs), touch screens, electronic paper, and tablet PCs are equipped with an optical layered body having functional layers with various properties such as antireflection properties, antistatic properties, hard coat properties, and antifouling properties. These image display devices need to have abrasion resistance so as to prevent scratch damages in handling.

For the above requirement, the abrasion resistance of the image display surface of an image display device is generally improved by utilizing an optical layered body having a hard coat (HC) layer disposed on a light-transmitting substrate and an optical layered body having optical properties such as antireflection properties and antiglare properties.

With respect to such an optical layered body having a hard coat layer, Patent Literature 1 discloses an optical layered body having a triacetylcellulose substrate which serves as a light-transmitting substrate and a hard coat layer containing a predetermined resin component and a predetermined amount of colloidal silica on the triacetylcellulose substrate.

Further, in order to impart properties such as antifouling properties to the above optical layered body having a hard coat layer, for example, an antifouling agent is added to the hard coat layer, and an additional optically functional layer such as a low refractive index layer is laminated on the upper surface of the hard coat layer.

It is, however, difficult for conventional optical layered bodies to sufficiently exert their properties such as antifouling properties even though the hard coat layer contains, for example, an antifouling agent. A method of adding a larger amount of an antifouling agent is considered so that the optical layered body can sufficiently exert the properties, for example. In this case, however, problems occur such as bleed out of the added antifouling agent and reduced transparency of the hard coat layer.

Further, formation of an additional optically functional layer on a hard coat layer of a conventional optical layered body also causes difficulty in sufficiently increasing the adhesion between the hard coat layer and the optically functional layer.

CITATION LIST

Patent Literature

Patent Literature 1: JP 2010-085985 A

SUMMARY OF INVENTION

Technical Problem

In the aforementioned situation, the present invention aims to provide an optical layered body which has a hard coat layer with a high hardness, which can sufficiently exert the properties owing to addition of a small amount of an antifouling agent and the like, which leads to, in the case that an optically functional layer such as a low refractive index layer is laminated on the upper surface of the hard coat layer, excellent adhesion between the optically functional layer and the hard coat layer, and which has excellent resistance to interference fringes. The present invention also aims to provide a polarizer and an image display device each comprising the aforementioned optical layered body.

Solution to Problem

The present invention relates to an optical layered body, comprising: a light-transmitting substrate; and a hard coat layer formed on the light-transmitting substrate, wherein the hard coat layer contains reactive irregularly shaped silica fine particles and a binder resin, the reactive irregularly shaped silica fine particles being unevenly distributed at the side of the light-transmitting substrate in the hard coat layer, the hard coat layer being divided in its thickness direction into three equal regions, a region (1), a region (2), and a region (3) in the order from the interface on the side of the light-transmitting substrate, the reactive irregularly shaped silica fine particles in the region (1) exhibiting a ratio of 30 to 90% in area, the reactive irregularly shaped silica fine particles in the region (2) exhibiting a ratio of 25 to 80% in area, the reactive irregularly shaped silica fine particles in the region (3) exhibiting a ratio of 10 to 35% in ratio, and the regions (1), (2), and (3) satisfying the following relationship: the ratio in area of the reactive irregularly shaped silica fine particles in the region (1) ≥ the ratio in area of the reactive irregularly shaped silica fine particles in the region (2)> the ratio in area of the reactive irregularly shaped silica fine particles in the region (3).

Preferably, the reactive irregularly shaped silica fine particles are formed by inorganic chemical bonding of 3 to 20 spherical silica fine particles having an average primary particle size of 1 to 100 nm, and have a reactive functional group on their surfaces.

Preferably, the reactive irregularly shaped silica fine particles are contained in the hard coat layer in an amount of 15 to 50 parts by mass for 100 parts by mass in total of the reactive irregularly shaped silica fine particles and the binder resin.

Preferably, the hard coat layer further contains an antifouling agent.

Preferably, the optical layered body further comprises a low refractive index layer on the hard coat layer.

Preferably, the light-transmitting substrate comprises triacetylcellulose.

The present invention also relates to a polarizer comprising a polarizing element, wherein said polarizer has any of the aforementioned optical layered bodies on the polarizing element surface.

The present invention also relates to an image display device comprising any of the aforementioned optical layered bodies or the polarizer on an outermost surface thereof.

The following will specifically describe the present invention.

The present inventor has studied an optical layered body having a hard coat layer on a light-transmitting substrate. The inventor has thereby found the following: a hard coat layer containing a binder resin and reactive irregularly shaped silica fine particles, and the reactive irregularly shaped silica fine particles contained in the hard coat layer at predetermined distribution, specifically, at uneven distribution on the side of the light-transmitting substrate at a predetermined proportion, lead to high hardness and sufficient achievement of the properties without addition of a large amount of an antifouling agent and the like, and an optically functional layer such as a low refractive index layer laminated on the hard coat layer leads to excellent adhesion between the optically functional layer and the hard coat layer. As a result, the present invention has been completed.

FIG. 1 is a schematic cross-sectional view showing one example of the optical layered body of the present invention.

As shown in FIG. 1, an optical layered body 10 of the present invention has a structure that a hard coat layer 12 is disposed on a light-transmitting substrate 11.

This hard coat layer 12 contains, although not illustrated, reactive irregularly shaped silica fine particles and a binder resin, and the reactive irregularly shaped silica fine particles are unevenly distributed at the side of the light-transmitting substrate 11 in the hard coat layer 12.

For example, in the case of using a soft substrate, such as a triacetylcellulose substrate (TAC substrate), as the light-transmitting substrate, the hardness (pencil hardness) of the optical layered body is low due to the influence of the substrate. This is notably observed in the case of thin substrate (for example, thickness of 40 µm). As the reactive irregularly shaped silica fine particles are unevenly distributed at the side of the light-transmitting substrate in the hard coat layer, however, a hard region exists on the side of the light-transmitting substrate in the hard coat layer. Thus, the optical layered body can have excellent hardness (pencil hardness). The optical layered body of the present invention is especially effective with a thin TAC substrate (with a thickness of about 25 to 65 µm).

The phrase "reactive irregularly shaped silica fine particles are unevenly distributed at the side of the light-transmitting substrate in the hard coat layer" means as follows: as shown in FIG. 1, the hard coat layer is divided in the thickness direction into three equal regions, a region (1), a region (2), and a region (3), from the interface on the side of the light-transmitting substrate, and the regions (1), (2), and (3) satisfy the relationship: the ratio in area of the reactive irregularly shaped silica fine particles in the regions (1) the ratio in area thereof in the region (2)> the ratio in area thereof in the region (3).

The amount of the reactive irregularly shaped silica fine particles at the cross section in the thickness direction of the hard coat layer can be determined by measuring the ratio in area of the reactive irregularly shaped silica fine particles in the cross section.

The ratio in area can be determined with a binary image (the amount of the reactive irregularly shaped silica fine particles is represented in area) of a TEM photograph of the cross section formed using an image analysis software Win Roof (Visual System Division, MITANI CORP.).

In the optical layered body of the present invention, the ratio in area of the reactive irregularly shaped silica fine particles in the region (1) is 30 to 90%. A ratio in area of lower than 30% fails to give sufficiently high hardness to the hard coat layer and, in the case that the light-transmitting substrate is a TAC substrate, interference fringes easily occur. In contrast, a ratio in area exceeding 90% causes an increased haze (occurrence of aggregation of particles and voids in particles) of the optical layered body of the present invention, poor adhesion with the light-transmitting substrate, cracks upon bending, and the like. In the case that the light-transmitting substrate is the below-mentioned TAC substrate, interference fringes may occur from the viewpoint of the refractive index.

With respect to the ratio in area of the reactive irregularly shaped silica fine particles in the region (1), its lower limit is preferably 40%, whereas its upper limit is preferably 80%.

The ratio in area of the reactive irregularly shaped silica fine particles in the region (2) is 25 to 80%. A ratio in area of lower than 25% fails to give sufficiently high hardness to the hard coat layer, whereas a ratio in area exceeding 80% causes an increased haze (occurrence of aggregation of particles and voids in particles) of the optical layered body of the present invention, cracks upon bending, and the like.

With respect to the ratio in area of the reactive irregularly shaped silica fine particles in the region (2), its lower limit is preferably 30%, whereas its upper limit is preferably 70%.

The ratio in area of the reactive irregularly shaped silica fine particles in the region (3) is 10 to 35%. A ratio in area of lower than 10% fails to give sufficiently high hardness to the hard coat layer, whereas, in the case of forming a low refractive index layer and the like on the upper surface of the hard coat layer, a ratio in area exceeding 35% causes insufficient adhesion between these layers because the amount of resin components contributing to the adhesion between the low refractive index layer and the hard coat layer is small. Further, in the case of adding an antifouling agent to be described later to the hard coat layer, the antifouling properties are less likely to be exerted. This is presumably because that a small amount of resin components in combination with a large amount of reactive silica fine particles may suppress appearance of the antifouling agent onto the surface. In the case that the light-transmitting substrate is a TAC substrate, the reactive irregularly shaped silica fine particles are likely to be removed during the saponification step in the production of the optical layered body of the present invention. In addition, the hard coat layer becomes brittle and, for example, in the pencil hardness test, a test mark remains on the surface of the hard coat layer, and cracks may occur upon bending.

With respect to the ratio in area of the reactive irregularly shaped silica fine particles in the region (3), its lower limit is preferably 15%, whereas its upper limit is preferably 30%.

In the optical layered body of the present invention, the ratios in area of the reactive irregularly shaped silica fine particles in the regions (1), (2), and (3) preferably exhibit a gradation.

As the regions (1), (2), and (3) each satisfy the aforementioned ratio in area, the optical layered body of the present invention can have a hard coat layer with high hardness; in the case of adding an antifouling agent and the like to the hard coat layer, only a small amount thereof enables sufficient achievement of its function; and in the case of forming a low refractive index layer and the like on the hard coat layer, the low refractive index layer and the hard coat layer show excellent adhesion therebetween.

Further, because the refractive index of the reactive irregularly shaped silica fine particles is lower than that of the binder resin constituting the hard coat layer, the refractive index in the hard coat layer can be increased in the order of region (1)≤ region (2)< region (3). If the refractive index in the hard coat layer changes as mentioned above, the refractive index difference between the region (1) and the light-transmitting substrate (e.g. TAC substrate) is smaller than the refractive index difference between the region (3) and the light-transmitting substrate (e.g. TAC substrate) in the hard coat layer. Thus, as mentioned later, such a refractive index is favorable from the viewpoint of preventing interference fringes.

Specifically, in the optical layered body of the present invention, the refractive index of the hard coat layer is about 1.50 to 1.53, the refractive index of the reactive irregularly shaped silica fine particles is about 1.42 to 1.46, and the refractive index of the TAC substrate is about 1.48 to 1.49. Thus, the refractive index of the region (1) is closer to that of the TAC substrate, and thereby interference fringes disappear.

As the refractive index in the hard coat layer shows a gradation in the order of region (1), region (2), and region (3), interference fringes can be favorably prevented.

The reactive irregularly shaped silica fine particles are preferably those formed by inorganic chemical bonding of 3 to 20 spherical silica fine particles with an average primary particle size of 1 to 100 nm and having a reactive functional group on their surfaces. Since such reactive irregularly shaped silica fine particles have a reactive functional group on their surfaces, they can react with a binder resin to be described later constituting the hard coat layer, and thus excellently give high hardness to the hard coat layer. Further, since they have a reactive functional group on their surfaces, the hard coat layer containing the reactive irregularly shaped silica fine particles also has excellent solution resistance. Such reactive irregularly shaped silica fine particles are preferable because, especially when a hard coat layer containing the particles is subjected to a saponification treatment (alkali treatment), the reactive irregularly shaped silica fine particles are less likely to be removed. If the reactive irregularly shaped silica fine particles are removed from the hard coat layer, the haze may increase, the transmittance may decrease, and the hardness may decrease, for example, and the antifouling properties may also deteriorate.

Being so-called irregularly shaped silica fine particles, the reactive irregularly shaped silica fine particles are tangled with each other and the binder resin and the reactive silica fine particles are tangled in the hard coat layer. Then, the tangled substances precipitate into the side of the light-transmitting substrate (region (1)) in the hard coat layer, so that the reactive silica fine particles can be filled at a high filling rate. Further, since the particles are irregularly shaped silica fine particles and can be filled at a high filling rate, they are excellent in solvent resistance and less likely to be removed when a saponification treatment (alkali treatment) is performed on the hard coat layer containing the particles. Accordingly, such reactive irregularly shaped silica fine particles are preferable.

In addition, the reactive irregularly shaped silica fine particles also have a characteristic that they are hard and especially have favorable pencil hardness because they are formed by inorganic chemical bonding of 3 to 20 spherical silica fine particles with an average primary particle size of 1 to 100 nm.

Furthermore, in the case that the light-transmitting substrate is a TAC substrate, the refractive index of silica ($SiO_2$) is as low as about 1.42 to 1.46 in the reactive irregularly shaped silica fine particles. Thus, the refractive index of the hard coat layer containing a binder resin with a refractive index of about 1.50 to 1.53 is made close to the refractive index of the TAC substrate (1.48 to 1.49), and the refractive index difference between the hard coat layer and the TAC substrate is made smaller. Thereby, so-called interference fringes are prevented.

With respect to the spherical silica fine particles constituting the reactive irregularly shaped silica fine particles, the term "spherical" is a concept including not only the precisely spherical shape but also substantially spherical shapes that can be approximated to a sphere, including spheroids, polyhedrons, and the like.

The spherical silica fine particles preferably have an average primary particle size of 1 to 100 nm. An average primary particle size of smaller than 1 nm may fail to improve the hardness of the hard coat layer, may cause a difficulty in production of such particles, may cause coagulation of particles, and may cause poor handleability due to high viscosity. An average particle size of greater than 100 nm may cause decreased transparency of the hard coat layer, may deteriorate the transmittance, and may cause an increase in the haze. With respect to the average primary particle size of the spherical silica fine particles, its lower limit is more preferably 5 nm, whereas its upper limit is more preferably 60 nm.

The average particle size of the reactive irregularly shaped silica fine particles (in other words, the average secondary particle size of the spherical silica fine particles) is preferably within the range from 5 to 300 nm, and more preferably within the range from 10 to 200 nm. The reactive irregularly shaped silica fine particles with an average particle size within the above range may easily give hardness to the hard coat layer and may make it easy to maintain the transparency of the hard coat layer.

The average primary particle size of the silica fine particles herein means a 50% particle size (d50 median diameter) obtained by measuring the particles in a solution by a dynamic light scattering method and expressing the obtained particle size distribution in cumulative distribution. The average primary particle size can be measured using a Microtrac particle size analyzer (NIKKISO CO., LTD.). Further, the average secondary particle size of the silica fine particles can also be determined by the same method as for the average primary particle size.

The reactive irregularly shaped silica fine particles are formed by inorganic chemical bonding of preferably 3 to 20, and more preferably 3 to 10 spherical silica fine particles. If the number of spherical silica fine particles bonded is less than three, the effect of increasing the hardness of the hard coat layer may be insufficient. In contrast, if the number of spherical silica fine particles bonded is more than 20, the transparency of the hard coat layer may deteriorate, the transmittance may deteriorate, and the haze may be high.

Such reactive irregularly shaped silica fine particles preferably exhibit an aspect ratio, in other words, the ratio between the long axis and the short axis, of 3 to 20 for a better effect of improving the abrasion resistance and hardness of the hard coat layer.

Examples of the inorganic chemical bond include ionic bond, metallic bond, coordination bond, and covalent bond. Preferable among these are bonds in which, when the reactive irregularly shaped silica fine particles are added to a polar solvent, the bonded spherical silica fine particles are not dispersed; specifically preferable are metallic bond, coordination bond, and covalent bond. More preferable is covalent bond. Examples of the polar solvent include water and lower alcohols such as methanol, ethanol, and isopropyl alcohol.

Examples of the particle state of the reactive irregularly shaped silica fine particles include agglomeration of particles in which 3 to 20 spherical silica fine particles are bonded by inorganic chemical bond and thereby agglomerated (agglomerated particles), and chain of particles in which 3 to 20 spherical silica fine particles are bonded by inorganic chemical bond in a chain state. Especially, from the viewpoint of improving the hardness of the hard coat layer, the particle state of the reactive irregularly shaped silica fine particles is preferably a chain of particles.

In the case that the reactive irregularly shaped silica fine particles are in the state of a chain of particles, the average number of bonded spherical silica fine particles can be determined as follows: the cross section of the hard coat layer is observed using a TEM picture thereof; 100 particles are selected from the hardened reactive irregularly shaped silica fine particles observed; the number of spherical silica fine particles included in the respective reactive irregularly shaped silica fine particles is counted; and the average value thereof is calculated.

The method for producing such reactive irregularly shaped silica fine particles is not particularly limited and may be selected from conventional methods as appropriate, as long as the method provides those in which the spherical silica fine particles are bonded by inorganic chemical bond. For example, the particles can be produced by adjusting the concentration or pH of a monodispersed silica fine particle dispersion, and then hydrothermally treating the dispersion at a temperature as high as 100° C. or higher. At this time, bonding of the silica fine particles may be accelerated by optionally adding a binder component.

Further, the silica fine particle dispersion to be used may be passed through an ion exchange resin so that ions are removed. Such an ion exchange treatment accelerates bonding of the silica fine particles. After the hydrothermal treatment, an ion exchange treatment may be performed again.

The reactive irregularly shaped silica fine particles have a reactive functional group on their surfaces.

The reactive functional group is not particularly limited, and may be selected as appropriate such that it is cross-linkable with a binder resin to be described later constituting the hard coat layer.

Specifically, a polymerizable unsaturated group may be favorably used as the reactive functional group. It is preferably a photo-curable unsaturated group, and particularly preferably an ionizing radiation-curable unsaturated group. Specific examples thereof include ethylenic unsaturated bonds such as (meth)acryloyl, vinyl, and allyl, and epoxy. Preferable among these are ethylenic unsaturated bonds.

Preferably, at least part of the surfaces of the reactive irregularly shaped silica fine particles is covered with an organic component, and the reactive functional group is introduced onto the surfaces by the organic component.

The organic component herein is a component containing carbon. The state of covering at least part of the surfaces with an organic component may be, for example, a state in which the hydroxy groups on the surfaces of the silica fine particles react with a compound containing organic components, such as a silane coupling agent, so that the organic components are bonded to part of the surfaces, or a state in which the hydroxy groups on the surfaces of the silica fine particles react with a compound containing organic components each having an isocyanato group so that the organic components are bonded to part of the surfaces. Examples of the state further include a state in which organic components adhere to the hydroxy groups on the surfaces of the silica fine particles by interaction such as hydrogen bond and a state in which polymer particles contain the silica fine particles.

The method for producing the reactive irregularly shaped silica fine particles whose surface is at least partially covered with an organic component and has a reactive functional group introduced thereonto by the organic component is not particularly limited, and any conventional method may be used.

The amount of the aforementioned reactive irregularly shaped silica fine particles is preferably 15 to 45 parts by mass for 100 parts by mass in total of the reactive irregularly shaped silica fine particles and a binder resin to be described later in the hard coat layer. If the amount is less than 15 parts by mass, the hardness of the hard coat layer may not be sufficiently improved. If the amount is more than 45 parts by mass, the distribution to be mentioned later of the reactive irregularly shaped silica fine particles may not be maintained; as a result, in the case of forming an optically functional layer such as a low refractive index layer on the upper surface of the hard coat layer, the hard coat layer and the optically functional layer may show insufficient adhesion therebetween.

The binder resin constituting the hard coat layer is favorably a transparent one. Specific examples thereof include ionizing radiation-curable resins which are curable by ultraviolet rays or an electron beam, mixtures of any ionizing radiation-curable resin and any solvent-drying resin (resin which is to be a coating only by drying a solvent added so as to adjust the solids content upon application), and thermosetting resins, and preferable are ionizing radiation-curable resins. The term "resin" herein is a concept including resin components such as monomers and oligomers.

Examples of the ionizing radiation-curable resin include those having a large number of functional groups, such as pentaerythritol tri(meth)acrylate, pentaerythritol tetra(meth)acrylate, dipentaerythritol tri(meth)acrylate, dipentaerythritol tetra(meth)acrylate, pentaerythritol penta(meth)acrylate, dipentaerythritol hexa(meth)acrylate, and trimethylolpropane tri(meth)acrylate, ethylene oxide-modified products thereof, propylene oxide-modified products thereof, and caprolactone-modified products thereof. The term "(meth)acrylate" herein means a methacrylate and an acrylate.

In addition to the above compounds, a relatively low molecular weight resin having an unsaturated double bond may also be used as the ionizing radiation-curable resin, such as polyester resin, polyether resin, acrylic resin, epoxy resin, urethane resin, alkyd resin, spiroacetal resin, polybutadiene resin, polythiol-polyene resin, and the like.

The ionizing radiation-curable resin may be used in combination with a solvent-drying resin. Combination use with a solvent-drying resin enables to prevent coating failure on the coating face effectively, and thereby better antiglare properties can be achieved. The solvent-drying resin to be used in combination with the ionizing radiation-curable resin is not particularly limited, and any thermoplastic resin can be used, in general.

The thermoplastic resin is not particularly limited, and examples thereof include styrenic resin, (meth)acrylic resin, vinyl acetate resin, vinyl ethereal resin, halogen-containing resin, alicyclic olefinic resin, polycarbonate resin, polyester resin, polyamide resin, cellulose derivatives, silicone resin, rubber, and elastomers. The thermoplastic resin is preferably amorphous and soluble in organic solvents (especially, common solvents which can dissolve multiple polymers and curable compositions). Particularly preferable from the viewpoints of film producibility, transparency, and weather resistance are styrenic resin, (meth)acrylic resin, alicyclic olefinic resin, polyester resin, and cellulose derivatives (e.g. cellulose esters), for example.

Examples of the thermosetting resin to be used as the binder resin include phenol resin, urea resin, diallyl phthalate resin, melamine resin, guanamine resin, unsaturated polyester resin, polyurethane resin, epoxy resin, amino alkyd resin, melamine-urea co-condensation resin, silicon resin, and polysiloxane resin.

In the case of using an ionizing radiation-curable resin (which serves as the binder resin) as an ultraviolet-curable resin, the composition for a hard coat layer preferably contains a photopolymerization initiator.

Examples of the photopolymerization initiator include acetophenones (e.g. trade name: Irgacure 184, BASF, 1-hydroxy-cyclohexyl-phenyl-ketone; trade name: Irgacure 907, BASF, 2-methyl-1[4-(methylthio)phenyl]-2-morpholino-propan-1-one), benzophenones, thioxanthones, benzoin, benzoin methyl ether, aromatic diazonium salts, aromatic sulfonium salts, aromatic iodonium salts, metallocene compounds, and benzoin sulfonic acid esters. Each of these may be used alone, or two or more of these may be used in combination.

In addition, Irgacure 127 (trade name, BASF, 2-hydroxy-1-{4-[4-(2-hydroxy-2-methyl-propionyl)benzyl]-phenyl}-2-methyl-propan-1-one), 2-benzyl-2-dimethylamino-1-(4-morpholinophenyl)-1-butanone, and 2-dimethylamino-2-(4-methyl-benzyl)-1-(4-morpholin-4-yl-phenyl)-butan-1-one may also be used in combination.

Further, products on the market other than those mentioned above may also be used. Specific examples thereof include Irgacure 369, Irgacure 379, Irgacure 819, Irgacure 500, Irgacure 754, Irgacure 250, Irgacure 1800, Irgacure 1870, Irgacure OXE01, DAROCUR TPO, and DAROCUR 1173 (all produced by BASF), Speedcure MBB, Speedcure PBZ, Speedcure ITX, Speedcure CTX, Speedcure EDB, Esacure ONE, Esacure KIP150, and Esacure KT046 (all produced by Nihon SiberHegner K.K.), and KAYACURE DETX-S, KAYACURE CTX, KAYACURE BMS, and KAYACURE DMBI (all produced by NIPPON KAYAKU Co., Ltd.).

The hard coat layer preferably further contains an antifouling agent.

As mentioned above, the reactive irregularly shaped silica fine particles in the hard coat layer are unevenly distributed at the side of the light-transmitting substrate. Thus, in the case that the hard coat layer contains an antifouling agent, the antifouling agent is to be unevenly distributed at the side opposite to the light-transmitting substrate in the hard coat layer. As a result, it is not required to use a large amount of the antifouling agent in order to impart sufficient antifouling properties to the hard coat layer.

The antifouling agent is not particularly limited, and examples thereof include silicone-containing antifouling agents, fluorine-containing antifouling agents, and silicone-containing/fluorine-containing antifouling agents. Each of these may be used alone, or two or more of these may be used in combination. It may be an acrylic antifouling agent.

Specific examples of the antifouling agent include a fluorine-containing antifouling agent (trade name: OPTOOL DAC, DAIKIN INDUSTRIES, ltd.).

The amount of the antifouling agent is preferably 0.01 to 1.0 parts by weight for 100 parts by mass of the aforementioned binder resin. Less than 0.01 parts by mass of the antifouling agent may fail to impart sufficient antifouling properties to the hard coat layer. More than 1.0 part by mass of the agent may cause poor hardness of the hard coat layer.

The antifouling agent preferably has a weight average molecular weight of 5,000 or lower. In order to improve the durability of the antifouling properties, it is preferably a compound having one or more reactive functional groups, and more preferably two or more groups. The weight average molecular weight can be determined by gel permeation chromatography (GPC) in terms of polystyrene.

Further, the reactive antifouling agent has favorable persistence (durability) of the antifouling properties; particularly in the case of the aforementioned fluorine-containing antifouling agent, fingerprints are suppressed (fingerprints are less likely to be noticed), and are favorably wiped out. In addition, the agent decreases the surface tension of the composition for a hard coat layer when the composition is coated. Thus, the agent has good leveling properties and provides favorable appearance of a hard coat layer to be formed.

The reactive antifouling agent is available from market products. Examples thereof other than the aforementioned products include silicone-containing agents such as SUA1900L10 (Shin-Nakamura Chemical Co., Ltd.), SUA1900L6 (Shin-Nakamura Chemical Co., Ltd.), Ebecryl 1360(DAICEL-CYTEC COMPANY LTD.), UT3971 (The Nippon Synthetic Chemical Industry Co., Ltd.), BYK UV3500 (BYK-Chemie), BYK UV3510 (BYK-Chemie), BYK UV3570 (BYK-Chemie), and fluorine-containing agents such as RS71 (DIC Corp.), RS74 (DIC Corp.), DEFENSA TF3001 (DIC Corp.), DEFENSA TF3000 (DIC Corp.), DEFENSA TF3028 (DIC Corp.), and LIGHT PROCOAT AFC3000 (KYOEISHA CHEMICAL Co., LTD.).

The hard coat layer may optionally contain an additional component in addition to the aforementioned components. Examples of such an additional component include resins other than the above binder resin, thermal polymerization initiators, ultraviolet absorbers, photopolymerization initiators, photostabilizers, leveling agents, cross-linkers, curing agents, polymerization accelerators, viscosity controlling agents, antistatic agents, antioxidants, slip agents, refractive-index modifiers, dispersing agents, antiblocking agents, and coloring agents. These may be conventional ones.

The hard coat layer may be formed by the following steps: dispersing the aforementioned reactive irregularly shaped silica fine particles, binder resin, and, if necessary, an antifouling agent and other optional components in a solvent to prepare a composition for a hard coat layer; applying the composition onto the light-transmitting substrate; drying the formed coating; and then curing the formed coating by ionizing radiation or heating.

The solvent may be selected depending on the type and solubility of the binder resin to be used. Examples thereof include ketones (e.g. acetone, methyl ethyl ketone, methyl isobutyl ketone, cyclohexanone), ethers (e.g. dioxane, tetrahydrofuran), aliphatic hydrocarbons (e.g. hexane), alicyclic hydrocarbons (e.g. cyclohexane), aromatic hydrocarbons (e.g. toluene, xylene), halogenated hydrocarbons (e.g. dichloromethane, dichloroethane), esters (e.g. methyl acetate, ethyl acetate, butyl acetate), water, alcohols (e.g. ethanol, isopropanol, butanol, cyclohexanol), cellosolves (e.g. methyl cellosolve, ethyl cellosolve), cellosolve acetates, sulfoxides (e.g. dimethyl sulfoxide), amides (e.g. dimethyl formamide, dimethyl acetamide), and mixed solvents thereof.

In particular, the solvent preferably contains a penetrating solvent which is permeable to a triacetylcellulose substrate.

In the present invention, the term "permeable" of the penetrating solvent includes all the concepts of permeability, swellability, wettability, and the like to the triacetylcellulose substrate. In the case that a light-transmitting substrate to be described later is a triacetylcellulose substrate, such a penetrating solvent swells and wets the triacetylcellulose substrate, and thus part of the composition for a hard coat layer penetrates into the triacetylcellulose substrate. As a result, the interface between the triacetylcellulose substrate and the hard coat layer can be substantially removed, and thereby interference fringes are further prevented and the triacetylcellulose substrate and the hard coat layer show better adhesion therebetween.

Specific examples of the penetrating solvent include ketones such as acetone, methyl ethyl ketone, cyclohexanone, methyl isobutyl ketone, and diacetone alcohols; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methyl glycol and methyl glycol acetate; ethers such as tetrahydrofuran, 1,4-dioxane, dioxolane, and diisopropyl ether; halogenated hydrocarbons such as methylene chloride, chloroform, and tetrachloroethane; glycol ethers such as methyl cellosolve, ethyl cellosolve, butyl cellosolve, and cellosolve acetate; dimethyl sulfoxide; and propylene carbonate, and mixtures thereof. Preferable among these are esters and ketones such as methyl acetate, ethyl acetate, butyl acetate, and methyl ethyl ketone. In addition, alcohols such as methanol, ethanol, isopropyl alcohol, butanol, and isobutyl alcohol, and aromatic hydrocarbons such as toluene and xylene may also be used as a mixture with the penetrating solvent.

In the optical layered body of the present invention, the reactive irregularly shaped silica fine particles contained in the hard coat layer are unevenly distributed at the side of the light-transmitting substrate in the hard coat layer, as mentioned above. Examples of the method for forming such a hard coat layer include a method of appropriately adjusting the conditions for drying the coating.

Specific examples thereof include a method in which a penetrating solvent to be described later is used as the solvent contained in the composition for a hard coat layer, and this solvent is applied onto the light-transmitting substrate to form a coating, and then the coating is dried under the conditions such that the binder resin contained in the coating slightly penetrates into the light-transmitting substrate. At this time, the hardness of the hard coat layer to be formed may be poor if a large amount of the binder resin penetrates into the light-transmitting substrate.

In the case of a solvent other than the penetrating solvent (i.e. non-penetrating solvent) as the solvent used in the composition for a hard coat layer, a method may be mentioned in which the binder resin is penetrated into the light-transmitting substrate by a technique such as increasing the temperature for drying the coating, decreasing the solids content in the composition for a hard coat layer, decreasing the molecular weight of the binder resin (about 450 or lower in terms of weight average molecular weight), or the like, so that the aforementioned hard coat layer is formed.

In the case of using a non-penetrating solvent for the composition for a hard coat layer, a method may be mentioned in which the coating is slowly dried and the reactive irregularly shaped silica fine particles are precipitated in the coating owing to their own weights. In this case, a binder resin is preferably one with a low viscosity. This is because as follows. In the region (1), the reactive irregularly shaped silica fine particles are tangled with each other and the silica density per unit volume becomes higher than that of the spherical silica. Thus, the particles precipitate. Then, the resistance of the binder resin against the precipitation of the particles per unit area in the region (1) decreases. Further, the binder resin is penetrated into the TAC substrate, and thereby the proportion of the reactive irregularly shaped silica fine particles in the region (1) increases. Thereby, gradation of the ratio in area of the reactive irregularly shaped silica fine particles is more effectively formed.

If convection occurs upon drying the coating, it may cause difference in the concentration of the reactive silica fine particles. Thus, the drying of the coating needs to be performed without convection (in other words, the positions of the reactive irregularly shaped silica fine particles are fixed at the early stage of drying).

In the drying step, it is not preferable to heat from the side of the light-transmitting substrate because convection occurs at the interface between the light-transmitting substrate and the hard coat layer. In contrast, drying from the side of the hard coat layer leads to formation of a coating at the early stage of drying and convection is suppressed. Thus, gradation of the ratio in area of the reactive irregularly shaped silica fine particles is likely to be formed.

Preferably, the light-transmitting substrate has smoothness and heat resistance, and has excellent mechanical strength. Specific examples of a material for forming a light-transmitting substrate include thermoplastic resins such as polyesters (polyethylene terephthalate, polyethylene naphthalate), acryl, cellulose triacetate, cellulose diacetate, cellulose acetate butyrate, polyamide, polyimide, polyether sulfone, polysulfone, polypropylene, polymethylpentene, polyvinyl chloride, polyvinyl acetal, polyether ketone, methyl polymethacrylate, polycarbonate, and polyurethane. Preferable are polyesters (polyethylene terephthalate, polyethylene naphthalate) and cellulose triacetate (TAC).

In the optical layered body of the present invention, the material for a light-transmitting substrate is particularly preferably TAC. This is because TAC enables to easily exert the effects of the present invention, and it also enables to easily form gradation of the ratio in area of the reactive irregularly shaped silica fine particles.

In the light-transmitting substrate, the thermoplastic resin is preferably used as a highly flexible film-shaped body. In addition, a plate of the above thermoplastic resin may be used, or a glass plate-shaped body may be used, for applications requiring curability.

Further, examples of the light-transmitting substrate also include an amorphous alicyclic olefin polymer (Cyclo-Olefin-Polymer: COP) film. This is a substrate formed from any of norbornene polymers, monocyclic olefinic polymers, cyclic conjugated diene polymers, vinyl alicyclic hydrocarbon polymers, and the like; Examples thereof include ZEONEX and ZEONOR (norbornene polymers) (ZEON CORP.), SUMILITE FS-1700 (Sumitomo Bakelite Co., Ltd.), ARTON (modified norbornene polymer) (JSR Corp.), APEL (cyclic olefin copolymer) (Mitsui Chemicals, Inc.), Topas (cyclic olefin copolymer) (Ticona), and OPTOREZ OZ-1000 series (alicyclic acrylic resin) (Hitachi Chemical Co., Ltd.).

Further, an FV series product (low birefringence and low photoelasticity film) (Asahi Kasei Chemicals Corp.) is also preferable as a substitutional substrate for triacetylcellulose.

The thickness of the light-transmitting substrate is preferably 20 to 300 µm; more preferably, its lower limit is 30 µm, whereas its upper limit is 200 µm. In the case that the light-transmitting substrate is a plate-shaped body, it may be thicker than this value. Before formation of the hard coat layer and the like on the light-transmitting substrate, the substrate may be subjected to a physical or chemical treatment such as corona discharge treatment or oxidation treatment, or the substrate may be coated with a coating called an anchoring agent or a primer so as to improve the adhesion. With a recent demand for thinner and lighter displays, the thickness of the substrate is preferably about 25 to 70 μm in the case of a TAC substrate. The optical layered body of the present invention is suitable for weight reduction. As the TAC substrate becomes thin, a problem in hardness becomes conspicuous due to the TAC substrate; however, in the optical layered body of the present invention, the hard coat layer has the aforementioned region (1), and thus can suitably solve such a problem in hardness.

The optical layered body of the present invention preferably further comprises a low refractive index layer on the hard coat layer.

As mentioned above, in the hard coat layer of the optical layered body of the present invention, the reactive irregularly shaped silica fine particles contained therein are unevenly distributed at the side of the light-transmitting substrate in the hard coat layer. Thus, the low refractive index layer and the hard coat layer show excellent adhesion therebetween. Further, the proportion of the reactive irregularly shaped silica fine particles in the region (3) is lower (the refractive index is higher) than that in the region (1), and thus the optical layered body exhibits lower reflection.

Examples of the low refractive index layer include a layer formed by mixing a low refractive index substance (e.g. silica, magnesium fluoride) into a resin, a layer of a low refractive index resin (e.g. fluororesin), a layer formed by mixing a low refractive index substance into a low refractive index resin, and a layer formed by mixing hollow fine particles as a low refractive index substance into a resin. The resin contained in the low refractive index layer is preferably an ultraviolet-curable resin because it is excellent in adhesion of the low refractive index layer with the hard coat layer.

Examples of the ultraviolet-curable resin include pentaerythritol tri(meth)acrylate, pentaerythritol tetra(meth)acrylate, dipentaerythritol tri(meth)acrylate, dipentaerythritol tetra(meth)acrylate, pentaerythritol penta(meth)acrylate, dipentaerythritol hexa(meth)acrylate, and trimethylolpropane tri(meth)acrylate. Suitably used among these are pentaerythritol triacrylate (PETA), dipentaerythritol hexaacrylate (DPHA), pentaerythritol hexaacrylate (PETTA), and trimethylolpropane triacrylate (TMPTA). In addition, polyfunctional urethane (meth)acrylates may be suitably used.

The ultraviolet-curable resin is preferably used in combination with a photopolymerization initiator. Examples of the photopolymerization initiator include acetophenones (e.g., trade name: Irgacure 184, BASF, 1-hydroxy-cyclohexyl-phenyl-ketone; trade name: Irgacure 907, BASF, 2-methyl-1[4-(methylthio)phenyl]-2-morpholinopropan-1-one), benzophenones, thioxanthones, benzoin, benzoin methyl ether, aromatic diazonium salts, aromatic sulfonium salts, aromatic iodonium salts, metallocene compounds, and benzoin sulfonic acid esters. Each of these may be used alone, or two or more of these may be used in combination.

Further, trade name Irgacure 127 (BASF, 2-hydroxy-1-{4-[4-(2-hydroxy-2-methyl-propionyl)benzyl]-phenyl}-2-methyl-propan-1-one), 2-benzyl-2-dimethylamino-1-(4-morpholinophenyl)-1-butanone, 2-dimethylamino-2-(4-methyl-benzyl)-1-(4-morpholin-4-yl-phenyl)-butan-1-one may also be used in combination.

In addition to the above products, other market products may also be used. Specific examples thereof include Irgacure 369, Irgacure 379, Irgacure 819, Irgacure 500, Irgacure 754, Irgacure 250, Irgacure 1800, Irgacure 1870, Irgacure OXE01, DAROCUR TPO, and DAROCUR 1173 (all produced by BASF), Speedcure MBB, Speedcure PBZ, Speedcure ITX, Speedcure CTX, Speedcure EDB, Esacure ONE, Esacure KIP150, and Esacure KT046 (all produced by Nihon SiberHegner K.K.), and KAYACURE DETX-S, KAYACURE CTX, KAYACURE BMS, and KAYACURE DMBI (all produced by NIPPON KAYAKU Co., Ltd.).

Suitably used among these is Irgacure 127 (trade name, BASF, 2-hydroxy-1-{4-[4-(2-hydroxy-2-methyl-propionyl)benzyl]-phenyl}-2-methyl-propan-1-one).

The hollow fine particles are particles containing gas or porous particles containing gas, and are particles whose refractive index is apparently reduced as the whole particles due to the voids formed by gas in comparison with the original refractive index of the solid parts of the particles. Examples of such hollow fine particles include silica fine particles disclosed in JP 2001-233611 A. In addition to particles of inorganic material such as silica, examples of the hollow fine particles also include hollow polymer particles disclosed in JP 2002-805031 A.

The average particle size of the hollow fine particles is about 5 to 300 nm, for example. The surfaces of the hollow fine particles preferably have an ultraviolet-curable functional group.

In the optical layered body of the present invention, the low refractive index layer preferably has a refractive index of lower than 1.450. A refractive index of not lower than 1.450 causes the optical layered body of the present invention to have insufficient antireflection properties, and thus the optical layered body may not be satisfactory for high-level display quality of recent image display devices. The lower limit thereof is more preferably 1.250, whereas the upper limit thereof is more preferably 1.425.

The thickness dA (nm) of the low refractive index layer preferably satisfies the following formula (I):

$$dA = m\lambda/(4\,nA) \tag{I}$$

wherein nA represents the refractive index of the low refractive index layer; m represents a positive odd number, preferably 1; λ represents a wavelength, preferably a value within the range from 480 to 580 nm.

In the present invention, the low refractive index layer preferably satisfies the following formula (II):

$$120 < nA\,dA < 145 \tag{II}$$

for a reduced reflectivity.

The low refractive index layer preferably has a haze value of not higher than 1%. A haze value exceeding 1% may cause the optical layered body of the present invention to have low transmittance and may cause deterioration in display quality of image display devices. The haze value is more preferably 0.5% or lower. The "haze value" herein means a value obtained in accordance with JIS K7136.

Such a low refractive index layer can be formed as follows: a composition for a low refractive index layer containing the aforementioned materials constituting the low refractive index layer and additional components is prepared; the composition is applied onto the surface of the hard coat layer to form a coating; drying the coating; and then curing the coating by ionizing radiation and/or heating.

The method for applying the composition for a low refractive index layer is not particularly limited. Examples thereof include various methods such as spin coating, dip coating, spray coating, die coating, bar coating, roll coating, meniscus coating, flexographic printing, screen printing, and bead coating.

Examples of the additional components which may optionally be contained in the aforementioned composition for a low refractive index layer include leveling agents, polymerization accelerators, viscosity improvers, antifouling agents, ultraviolet absorbers, antioxidants, antiblocking agents, coloring agents, antistatic agents, and resins other than the aforementioned ones.

The optical layered body of the present invention may further have an additional layer, if necessary, such as hard coat layers other than the aforementioned hard coat layer, high refractive index layers, middle refractive index layers, antistatic layers, antiglare layers, and antifouling layers.

In the optical layered body of the present invention, the hardness is preferably 2H or higher, and more preferably 3H or higher, measured by the pencil hardness test (load: 4.9 N) in accordance with JIS K5600-5-4 (1999).

When the surface of the optical layered body of the present invention is observed after the surface is rubbed in a reciprocating manner 10 times at a rubbing load of 500 g/cm$^2$ using #0000 steel wool, it is preferable that no exfoliation of the coating on the surface is observed. It is more preferable that no exfoliation of the coating on the surface is observed after the surface is rubbed in a reciprocating manner 10 times at a rubbing load of 700 g/cm$^2$ in the same manner. It is most preferable that no exfoliation of the coating on the surface is observed after the surface is rubbed in a reciprocating manner 10 times at a rubbing load of 1000 g/cm$^2$ in the same manner.

The optical layered body of the present invention preferably has a total light transmittance of 80% or higher. A total light transmittance of lower than 80% may deteriorate color reproducibility and visibility in the case of mounting the optical layered body on the surface of a display. The total light transmittance is more preferably 90% or higher.

The optical layered body of the present invention preferably has a haze value of not higher than 1%. A haze value exceeding 1% may cause the optical layered body of the present invention to have deteriorated transmittance, which may cause deterioration in display quality of image display devices. The haze value is more preferably 0.5% or lower.

The haze can be determined by the method in accordance with JIS K-7136 using a haze meter (MURAKAMI COLOR RESEARCH LABORATORY, product number: HM-150).

Examples of the method for producing the optical layered body of the present invention include a method including a step of applying the aforementioned composition for a hard coat layer onto the light-transmitting substrate to form a hard coat layer, and optionally a step of applying the aforementioned composition for a low refractive index layer onto the formed hard coat layer to form a low refractive index layer.

The hard coat layer and the low refractive index layer can be formed by the aforementioned method.

The drying conditions for unevenly distributing the reactive irregularly shaped silica fine particles in the hard coat layer are preferably as follows: that is, drying temperature of 40° C. to 90° C. and drying time of 30 to 90 seconds. At this time, the solids content in the composition for a hard coat layer is preferably 30 to 50%.

The optical layered body of the present invention is used as a polarizer by disposing the optical layered body of the present invention on the surface of a polarizing element such that the surface opposite to the hard coat layer of the optical layered body faces polarizing element. Such a polarizer is also one aspect of the present invention.

The polarizing element is not particularly limited. Examples thereof include a polyvinyl alcohol film, a polyvinyl formal film, a polyvinyl acetal film, and a saponified ethylene-vinyl acetate copolymer film, each of which is dyed with iodine or the like and then stretched.

In lamination of the polarizing element and the optical layered body of the present invention, it is preferable to perform saponification treatment on the light-transmitting substrate (preferably triacetylcellulose substrate). Such saponification treatment provides favorable adhesion and an antistatic effect.

The present invention also relates to an image display device comprising the aforementioned optical layered body or polarizer on the outermost surface.

The image display device may be such an image display device as LCDs, PDPs, FEDs, ELDs (organic EL, inorganic EL), CRTs, electronic paper, touch screens, and tablet PCs.

The LCD comprises a transparent-type display and a light source device which applies light to the transparent-type display from behind. In the case that the image display device of the present invention is an LCD, the display device comprises the optical layered body of the present invention or the polarizer of the present invention formed on the transparent-type display.

In the case that the present invention relates to a liquid crystal display device comprising the optical layered body, the light from the light source is applied from below the optical layered body. An STN-type liquid crystal display device may further comprises a retardation plate between the liquid crystal display element and the polarizer. Adhesive layers may optionally be disposed between the respective layers in the liquid crystal display device.

The PDP comprises a top glass plate (its surface has an electrode) and a back glass plate (its surface has an electrode and fine grooves, and the fine grooves have red, green, and blue fluorescent layers thereon) facing the top glass plate, and discharge gas is sealed between the plates. In the case that the image display device of the present invention is a PDP, it further comprises the optical layered body on the surface of the top glass plate or a front plate (glass substrate or film substrate) thereof.

The image display device may be an image display device such as an ELD device in which a luminous body (e.g. zinc sulfide, diamine substances) that emits light by a voltage is deposited on a glass substrate and an image is displayed by adjusting voltages applied to the substrate, or a CRT display in which electric signals are converted into light and thereby an image visible to the human eyes is produced. In this case, such a display device comprises the aforementioned antireflection film on the outermost surface or a front plate thereof.

In either case, the image display device of the present invention can be used as a display for any of televisions, computers, word processors, and the like. In particular, the image display device can be suitably disposed on the surface of any high-definition imaging displays such as CRTs, liquid crystal display panels, PDPs, ELDs, FEDs, electronic paper, touch screens, and tablet PCs.

Advantageous Effects of Invention

The antireflection film of the present invention has a hard coat layer that contains reactive irregularly shaped silica fine particles, and the reactive irregularly shaped silica fine particles are unevenly distributed at the side of a light-transmitting substrate in the hard coat layer at a predetermined proportion. Thus, the hard coat layer can have high hardness and, in the case of adding an antifouling agent and the like to the hard coat layer, even a small amount thereof enables to exert its effects sufficiently. Further, in the case of disposing an optically functional layer such as a low refractive index layer on the upper surface of the hard coat layer, the optically functional layer and the hard coat layer can show excellent adhesion therebetween.

In addition, in the case that the light-transmitting substrate is a triacetylcellulose substrate, interference fringes can be favorably suppressed at the interface between the hard coat layer and the triacetylcellulose substrate. Thus, the antireflection film of the present invention can be suitably used for any of displays such as cathode-ray tube display devices (CRTs), liquid crystal displays (LCDs), plasma display panels (PDPs), electroluminescence displays (ELDs), and field emission displays (FEDs).

BRIEF DESCRIPTION OF THE DRAWINGS

FIG. 1 is a schematic cross-sectional view showing one example of the optical layered body of the present invention.

MODES FOR CARRYING OUT THE INVENTION

The following will describe the contents of the present invention referring to examples, but the contents of the present invention are not limited to these embodiments. The terms "part(s)" and "%" is based on the mass, unless otherwise mentioned. Further, the amounts of the respective components are solids contents, unless otherwise mentioned.

The following components were mixed to prepare Compositions 1 to 18 for a hard coat layer.
(Composition 1 for a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)
Dipentaerythritol hexaacrylate (NIPPON KAYAKU Co., Ltd., DPHA) 70 parts by weight
Photopolymerization initiator (BASF, Irgacure 184) 4 parts by weight
MIBK 75 parts by weight
(Composition 2 for a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 100 parts by weight (40 parts by weight in solids content)
Dipentaerythritol hexaacrylate (NIPPON KAYAKU Co., Ltd., DPHA) 60 parts by weight
Photopolymerization initiator (BASF, Irgacure 184) 4 parts by weight
MIBK 60 parts by weight
(Composition 3 For a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 62 parts by weight (25 parts by weight in solids content)
Dipentaerythritol hexaacrylate (NIPPON KAYAKU Co., Ltd., DPHA) 75 parts by weight
Photopolymerization initiator (BASF, Irgacure 184) 4 parts by weight
MIBK 83 parts by weight (Composition 4 For a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 125 parts by weight (50 parts by weight in solids content)
Dipentaerythritol hexaacrylate (NIPPON KAYAKU Co., Ltd., DPHA) 50 parts by weight
Photopolymerization initiator (BASF, Irgacure 184) 4 parts by weight
MIBK 45 parts by weight
(Composition 5 for a Hard Coat Layer)
Reactive irregularly shaped silica fine particles (JGC Catalysts and Chemicals Ltd., trade name: DP1039-1 SIV (average primary particle size: 45 nm, average number of particles bonded: 4, solids content: 40%, MIBK solvent)) 113 parts by weight (45 parts by weight in solids content)
Dipentaerythritol hexaacrylate (NIPPON KAYAKU Co., Ltd., DPHA) 55 parts by weight Photopolymerization initiator (BASF, Irgacure 184) 4 parts by weight
MIBK 52 parts by weight
(Composition 6 For a Hard Coat Layer)
Reactive irregularly shaped silica fine particles (JGC Catalysts and Chemicals Ltd., trade name: DP1039-2 SIV (average primary particle size: 20 nm, average number of particles bonded: 8, solids content: 40%, MIBK solvent)) 75 parts by weight (30 parts by weight in solids content)
Dipentaerythritol hexaacrylate (NIPPON KAYAKU Co., Ltd., DPHA) 70 parts by weight
Photopolymerization initiator (BASF, Irgacure 184) 4 parts by weight
MIBK 75 parts by weight
(Composition 7 For a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)
Pentaerythritol triacrylate (NIPPON KAYAKU Co., Ltd., PET30) 70 parts by weight
Photopolymerization initiator (BASF, Irgacure 184) 4 parts by weight
MIBK 75 parts by weight
(Composition 8 For a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)
Dipentaerythritol hexaacrylate (NIPPON KAYAKU Co., Ltd., DPHA) 40 parts by weight
Polymer acrylate (ARAKAWA CHEMICAL INDUSTRIES, LTD., BEAMSET BS371, solids content: 65%, butyl acetate solvent) 40 parts by weight (30 parts by weight in solids content)
Antifouling agent (DIC Corp., RS71, reactive group-containing fluorooligomer) 1 part by weight in solids content
Photopolymerization initiator (BASF, Irgacure 184) 4 parts by weight
MIBK 75 parts by weight
(Composition 9 For a Hard Coat Layer)
Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight Fluorine antifouling agent (DIC Corp., RS71) 0.5 parts by weight in solids content MIBK 75 parts by weight (Composition 10 For a Hard Coat Layer)

Spherical reactive silica fine particles (Nissan Chemical Industries, Ltd., trade name MIBKSD (average primary particle size: 12 nm, average number of particles bonded: 0, solids content: 40%, MIBK solvent)) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight MIBK 75 parts by weight (Composition 11 For a Hard Coat Layer)

Irregularly shaped non-reactive silica fine particles (JGC Catalysts and Chemicals Ltd., average primary particle size: 20 nm, average number of particles bonded: 4, solids content: 40%, MIBK solvent) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight MIBK 75 parts by weight (Composition 12 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 25 parts by weight (10 parts by weight in solids content)

Dipentaerythritol hexaacrylate (NIPPON KAYAKU Co., Ltd., DPHA) 90 parts by weight Photopolymerization initiator (BASF, Irgacure 184) 4 parts by weight MIBK 105 parts by weight (Composition 13 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight MIBK 15 parts by weight (Composition 14 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight MIBK 75 parts by weight (Composition 15 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 175 parts by weight (70 parts by weight in solids content)

Dipentaerythritol hexaacrylate (NIPPON KAYAKU Co., Ltd., DPHA) 30 parts by weight Photopolymerization initiator (BASF, Irgacure 184) 4 parts by weight MIBK 15 parts by weight (Composition 16 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 175 parts by weight (70 parts by weight in solids content)

Dipentaerythritol hexaacrylate (NIPPON KAYAKU Co., Ltd., DPHA) 30 parts by weight Photopolymerization initiator (BASF, Irgacure 184) 4 parts by weight MIBK 200 parts by weight (Composition 17 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 75 parts by weight (30 parts by weight in solids content)

Dipentaerythritol hexaacrylate (NIPPON KAYAKU Co., Ltd., DPHA) 70 parts by weight Photopolymerization initiator (BASF, Irgacure 184) 4 parts by weight MIBK 100 parts by weight (Composition 18 For a Hard Coat Layer)

Reactive irregularly shaped silica fine particles (JGC Catalysts and Chemicals Ltd., trade name: DP1039SIV (average primary particle size: 20 nm, average number of particles bonded: 4, solids content: 40%, MIBK solvent)) 175 parts by weight (70 parts by weight in solids content)

Dipentaerythritol hexaacrylate (NIPPON KAYAKU Co., Ltd., DPHA) 30 parts by weight Photopolymerization initiator (BASF, Irgacure 184) 4 parts by weight Fluorine antifouling agent (DIC Corp., RS71) 0.5 parts by weight in solids content MIBK 15 parts by weight EXAMPLES 1 To 9, COMPARATIVE EXAMPLES 1 to 4 and 6 to 9

A light-transmitting substrate (thickness: 40 µm, triacetylcellulose resin film (FUJIFILM Corp., TD40UL)) was prepared. The composition for a hard coat layer shown in Table 1 was applied onto one face of the light-transmitting substrate, and thereby a coating was formed. Then, the coating was dried in a 70° C. heat oven for 60 seconds and the solvent in the coating was evaporated. Thereafter, the coating was irradiated with ultraviolet rays until the integrated light intensity reached 200 mJ, and the coating was cured. Thereby, a hard coat layer was formed at 13 g/m² (dry, thickness: 10 µm), and then an optical layered body according to each of Examples 1 to 9 and Comparative Examples 1 to 4 and 6 to 9 was produced.

COMPARATIVE EXAMPLE 5

An optical layered body according to Comparative Example 5 was produced in the same manner as in Example 1, except that the side where the composition for a hard coat layer was applied thereonto was placed downward when drying the coating in a 70° C. heat oven for 60 seconds.

The optical layered bodies produced in the examples and comparative examples were evaluated by the following methods. Table 1 shows the results.

(Pencil Hardness)

The hardness by a pencil scratch test was measured as follows: the optical layered bodies produced in the examples and comparative examples were subjected to humidity control at a temperature of 25° C. and a relative humidity of 60% for 2 hours; the optical layered bodies were subjected (Interference Fringes)

On the face opposite to the hard coat layer of each of the optical layered bodies according to the examples and comparative examples was attached a black tape, and the presence of interference fringes was visually observed under the light of a triple-wavelength straight fluorescent lamp. The case where no interference fringes were observed was rated as "Good" the case where slight fringes were observed visually was rated as "Acceptable", and the case where fringes were observed was rated as "Poor".

TABLE 1

| | Composition for hard coat layer | Ratio in area (%) | | | Type of silica | | | Pencil hardness | SW resistance (g/cm$^2$) | Haze (%) | Adhesion | Interference fringes |
|---|---|---|---|---|---|---|---|---|---|---|---|---|
| | | Region (1) | Region (2) | Region (3) | Primary particle size | Number of particles bonded | Reactivity | | | | | |
| Example 1 | 1 | 40 | 40 | 14 | 20 nm | 4 | Yes | 4H | 1500 | 0.4 | 100/100 | Good |
| Example 2 | 2 | 70 | 60 | 20 | 20 nm | 4 | Yes | 5H | 1500 | 0.5 | 100/100 | Good |
| Example 3 | 3 | 35 | 30 | 14 | 20 nm | 4 | Yes | 4H | 1500 | 0.4 | 100/100 | Good |
| Example 4 | 4 | 85 | 75 | 30 | 20 nm | 4 | Yes | 5H | 1500 | 0.6 | 100/100 | Good |
| Example 5 | 5 | 40 | 40 | 14 | 45 nm | 4 | Yes | 5H | 1500 | 0.4 | 100/100 | Good |
| Example 6 | 6 | 40 | 40 | 14 | 20 nm | 8 | Yes | 4H | 1500 | 0.5 | 100/100 | Good |
| Example 7 | 7 | 40 | 40 | 14 | 20 nm | 4 | Yes | 4H | 1500 | 0.5 | 100/100 | Good |
| Example 8 | 8 | 40 | 40 | 14 | 20 nm | 4 | Yes | 4H | 1500 | 0.5 | 100/100 | Good |
| Example 9 | 9 | 40 | 40 | 14 | 20 nm | 4 | Yes | 4H | 1500 | 0.4 | 100/100 | Good |
| Comparative Example 1 | 10 | 40 | 40 | 14 | 12 nm | 0 | Yes | 3H | 1500 | 0.4 | 100/100 | Good |
| Comparative Example 2 | 11 | 40 | 40 | 14 | 20 nm | 4 | No | 2H | 500 | 0.4 | 100/100 | Good |
| Comparative Example 3 | 12 | 10 | 10 | 5 | 20 nm | 4 | Yes | 2H | 1500 | 0.4 | 100/100 | Poor |
| Comparative Example 4 | 13 | 33 | 30 | 33 | 20 nm | 4 | Yes | 3H | 700 | 0.4 | 100/100 | Acceptable |
| Comparative Example 5 | 14 | 14 | 40 | 40 | 20 nm | 4 | Yes | 3H | 500 | 0.4 | 100/100 | Poor |
| Comparative Example 6 | 15 | 90 | 90 | 70 | 20 nm | 4 | Yes | 3H | 500 | 1.5 | 0/100 | Acceptable |
| Comparative Example 7 | 16 | 30 | 75 | 95 | 20 nm | 4 | Yes | 3H | 1500 | 0.6 | 0/100 | Good |
| Comparative Example 8 | 17 | 2 | 30 | 40 | 20 nm | 4 | Yes | 3H | 1500 | 0.4 | 100/100 | Poor |
| Comparative Example 9 | 18 | 90 | 90 | 70 | 20 nm | 4 | Yes | 3H | 500 | 1.5 | 0/100 | Acceptable | to the pencil hardness test (500 g load) in accordance with JIS K5600-5-4 (1999) using a test pencil in accordance with JIS S6006; and the highest hardness at which no damage occurred was determined.

(Steel Wool (SW) Resistance)

The surface of the hard coat layer of each of the optical layered bodies according to the examples and comparative examples was rubbed 10 times in a reciprocating manner using #0000 steel wool, and the highest rubbing load (g/cm$^2$) at which no exfoliation of the coating occurred was determined.

(Haze)

The haze value (%) was measured using a haze meter (MURAKAMI COLOR RESEARCH LABORATORY, product number: HM-150) in accordance with JIS K-7136.

(Adhesion)

On the hard coat layer of each of the optical layered bodies according to the examples and comparative examples were drawn 100 squares (1 mm square), and the hard coat layer was subjected to a peeling test for five times in a row using 24-mm Cellotape (registered trademark) (Nichiban Co., Ltd.) in accordance with JIS K5600. Then, the number of squares remained was counted.

Table 1 shows the ratio (number of squares remained)/(total number of squares: 100).

Table 1 shows that each of the optical layered bodies according to the examples had a pencil hardness of 4H or higher, and had favorable the SW resistance, haze, and adhesion.

In contrast, each of the optical layered bodies according to the comparative examples had a pencil hardness of 3H or lower, and none of the SW resistance, haze, and adhesion was excellent.

REFERENCE EXAMPLE 1

A light-transmitting substrate (thickness: 40 μm, triacetylcellulose resin film (FUJIFILM Corp., TD40UL)) was prepared. The Composition 1 for a hard coat layer was applied onto one face of the light-transmitting substrate, and thereby a coating was formed. Then, the coating was dried in a 70° C. heat oven for 60 seconds and the solvent in the coating was evaporated. Thereafter, the coating was irradiated with ultraviolet rays until the integrated light intensity reached 70 mJ, and the coating was cured (semi-cured). Thereby, a hard coat layer was formed at 13 g/m$^2$ (dry, thickness: 10 μm).

Further, a Composition 1 for a low refractive index layer to be described below was applied onto the hard coat layer to form a coating. Then, the coating was dried in a 70° C. heat oven for 60 seconds and the solvent in the coating was evaporated. Thereafter, the coating was irradiated with ultraviolet rays until the integrated light intensity reached 200 mJ, and the coating was cured. Thereby, an optical layered body comprising a 100-nm-thick low refractive index layer was produced.

Composition 1 For a Low Refractive Index Layer

Hollow treated silica fine particles (solids content of silica fine particles: 20% by mass, solvent: methyl isobutyl ketone, average particle size: 50 nm) 73 parts by mass Fluorine atom-containing polymer (JSR Corp., OPSTAR TU2224, solids content: 20%, solvent: methyl isobutyl ketone) 2 parts by mass in solids content Fluorine atom-containing monomer (kyoeisha Chemical Co., Ltd., LINC3A, solids content: 100%) 5 parts by mass Pentaerythritol triacrylate (PETA) 3 parts by mass Polymerization initiator (Irgacure 127, BASF) 0.35 parts by mass Silicone- and fluorine atom-containing antifouling agent (TU2225, JSR Corp.) 0.5 parts by mass in solids content Methyl isobutyl ketone (MIBK) 320 parts by mass Propylene glycol monomethyl ether (PGME) 161 parts by mass As a result, the optical layered body comprising the obtained low refractive index layer achieved the evaluations for the ratio in area, pencil hardness, haze, adhesion, and interference fringes similar to Example 1. However, because the optical layered body comprises the low refractive index layer, the SW resistance was 400 g/cm$^2$ and, with respect to the reflectance, the Y value was 0.98%. The Y value means a value obtained by measuring the 5-degree regular reflectance within a wavelength range from 400 to 700 nm using an optical measurement device (SHIMADZU CORP., UV-3100PC, spectrometer), and then correcting the luminosity factor in accordance with JIS Z8701.

INDUSTRIAL APPLICABILITY

The optical layered body of the present invention comprises the hard coat layer with the aforementioned structure, and thus is excellent in hardness, can sufficiently exert its function by addition of a small amount of an antifouling agent and the like, and, in the case of disposing an optically functional layer such as a low refractive index layer on the hard coat layer, the hard coat layer and the optically functional layer show excellent adhesion therebetween.

Therefore, the optical layered body of the present invention can be suitably used for any of cathode-ray tube display devices (CRTs), liquid crystal displays (LCDs), plasma display panels (PDPs), electroluminescence displays (ELDs), field emission displays (FEDs), and the like.

REFERENCE SIGNS LIST

10: optical layered body
11: light-transmitting substrate
12: hard coat layer

The invention claimed is:

1. An optical layered body, comprising:
a light-transmitting substrate; and
a hard coat layer formed on the light-transmitting substrate,
wherein the hard coat layer contains reactive irregularly shaped silica fine particles and a binder resin, the reactive irregularly shaped silica fine particles being unevenly distributed at the side of the light-transmitting substrate in the hard coat layer,
the hard coat layer being divided in its thickness direction into three equal regions, a region (1), a region (2), and a region (3) in the order from the interface on the side of the light-transmitting substrate,
the reactive irregularly shaped silica fine particles in the region (1) exhibiting a ratio of 30 to 90% in area,
the reactive irregularly shaped silica fine particles in the region (2) exhibiting a ratio of 25 to 80% in area,
the reactive irregularly shaped silica fine particles in the region (3) exhibiting a ratio of 10 to 20% in area, and
the regions (1), (2), and (3) satisfying the following relationship: the ratio in area of the reactive irregularly shaped silica fine particles in the region (1)≥the ratio in area of the reactive irregularly shaped silica fine particles in the region (2)>the ratio in area of the reactive irregularly shaped silica fine particles in the region (3).

2. The optical layered body according to claim 1, wherein the reactive irregularly shaped silica fine particles are formed by inorganic chemical bonding of 3 to 20 spherical silica fine particles having an average primary particle size of 1 to 100 nm, and have a reactive functional group on their surfaces.

3. The optical layered body according to claim 2, wherein the reactive irregularly shaped silica fine particles are contained in the hard coat layer in an amount of 15 to 50 parts by mass for 100 parts by mass in total of the reactive irregularly shaped silica fine particles and the binder resin.

4. The optical layered body according to claim 2, wherein the hard coat layer further contains an antifouling agent.

5. The optical layered body according to claim 2, further comprising a low refractive index layer on the hard coat layer.

6. The optical layered body according to claim 2, wherein the light-transmitting substrate comprises triacetylcellulose.

7. A polarizer comprising a polarizing element, wherein said polarizer has the optical layered body according to claim 2 on the polarizing element surface.

8. The optical layered body according to claim 1, wherein the reactive irregularly shaped silica fine particles are contained in the hard coat layer in an amount of 15 to 50 parts by mass for 100 parts by mass in total of the reactive irregularly shaped silica fine particles and the binder resin.

9. The optical layered body according to claim 8, wherein the hard coat layer further contains an antifouling agent.

10. The optical layered body according to claim 8, further comprising a low refractive index layer on the hard coat layer.

11. The optical layered body according to claim 8, wherein the light-transmitting substrate comprises triacetylcellulose.

12. A polarizer comprising a polarizing element, wherein said polarizer has the optical layered body according to claim 8 on the polarizing element surface.

13. The optical layered body according to claim 1, wherein the hard coat layer further contains an antifouling agent.

14. The optical layered body according to claim 13, further comprising a low refractive index layer on the hard coat layer.

15. The optical layered body according to claim 13, wherein the light-transmitting substrate comprises triacetylcellulose.

16. The optical layered body according to claim 1, further comprising a low refractive index layer on the hard coat layer.

17. The optical layered body according to claim 16, wherein the light-transmitting substrate comprises triacetylcellulose.

18. The optical layered body according to claim 1, wherein the light-transmitting substrate comprises triacetylcellulose.

19. A polarizer comprising a polarizing element, wherein said polarizer has the optical layered body according to claim 1, on the polarizing element surface.

20. An image display device comprising on an outermost surface thereof, the optical layered body according to claim 1, or a polarizer comprising a polarizing element and said optical layered body on the polarizing element surface.

21. The optical layered body of claim 1, wherein the reactive irregularly shaped silica fine particles in the region (1) exhibit a ratio of 35 to 85% in area, and the reactive irregularly shaped silica fine particles in the region (2) exhibit a ratio of 30 to 70% in area.

* * * * *